(12) United States Patent
Inaoka et al.

(10) Patent No.: US 6,890,042 B2
(45) Date of Patent: May 10, 2005

(54) CRAWLER TRAVELING APPARATUS

(75) Inventors: Motonari Inaoka, Sakai (JP); Yuji Tomiyama, Sakai (JP); Yoshikazu Aota, Sakai (JP); Takashi Kobayashi, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 10/652,895

(22) Filed: Aug. 29, 2003

(65) Prior Publication Data

US 2004/0135433 A1 Jul. 15, 2004

(30) Foreign Application Priority Data

Jan. 10, 2003 (JP) ........................................ 2003-004614

(51) Int. Cl.⁷ .............................................. B62D 55/24
(52) U.S. Cl. ..................... 305/173; 305/157; 305/195; 180/9
(58) Field of Search ................................ 305/157, 160, 305/165, 136, 173, 174, 199, 195, 178, 180, 193, 194; 180/9.1, 9.62, 9.26

(56) References Cited

U.S. PATENT DOCUMENTS

| | | | | |
|---|---|---|---|---|
| 1,814,046 A | * | 7/1931 | Kegresse | 305/180 |
| 2,998,998 A | * | 9/1961 | Hyler et al. | 305/145 |
| 3,948,572 A | * | 4/1976 | Korner et al. | 305/195 |
| 4,458,955 A | | 7/1984 | Webb | |
| 4,560,018 A | * | 12/1985 | Satzler | 180/9.1 |
| 5,279,378 A | | 1/1994 | Grawey et al. | |
| 5,984,438 A | | 11/1999 | Tsunoda et al. | |
| 6,030,058 A | | 2/2000 | Snyder et al. | |
| 6,193,335 B1 | | 2/2001 | Edwards | |
| 6,199,646 B1 | | 3/2001 | Tani et al. | |

FOREIGN PATENT DOCUMENTS

JP            6-329059         11/1994

\* cited by examiner

*Primary Examiner*—Frantz F. Jules
(74) *Attorney, Agent, or Firm*—Webb Ziesenheim Logsdon Orkin & Hanson, P.C.

(57) ABSTRACT

A crawler traveling apparatus includes a rubber crawler belt having a plurality of driving projections formed with a predetermined peripheral pitch on an inner peripheral face of the belt, a drive wheel rotatable when engaged with the driving projections of the crawler belt for driving the belt, and a plurality of free wheels rotatable for laterally guiding the driving projections under movement. Each driving projection has an upper half having a lateral face including an upper half lateral face portion and a lower half having a lower half lateral face portion, the upper half lateral face portion having an erect inclination angle smaller than an erect inclination angle of the lower half lateral face portion. Each free wheel has an inner lateral face opposed to the driving projection, the inner lateral face having an inclined guide face having an inclination parallel to the lower half lateral face portion of the driving projection. The inclined guide face has a height L3 shorter than a height L1 of the lower half lateral face portion when an inner peripheral face of the crawler belt is placed under proper contact with an outer peripheral face of the free wheel.

3 Claims, 8 Drawing Sheets

CRAWLER TRAVELING APPARATUS

BACKGROUND OF THE INVENTION

1. Field of the Invention

The present invention relates to a crawler traveling apparatus for use mainly in a tractor and relates more particularly to a crawler traveling apparatus using a rubber crawler belt.

2. Description of the Related Art

Figure 6:
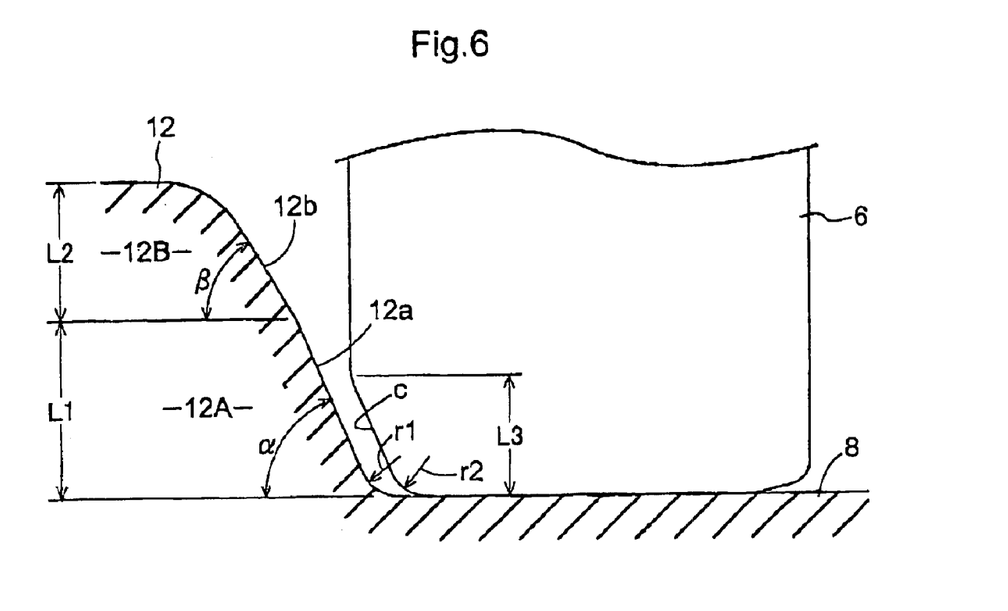
FIG. 6 is an enlarged front view showing a left lower portion of the ground free wheel and a driving projection of the crawler belt during a traveling on a flat terrain.

Such crawler traveling apparatus using a rubber crawler belt is typically known from FIG. 6 of the Japanese Patent Application "Kokai" No.: Hei. 6-329059. In this, the crawler belt includes, in its inner peripheral face, a plurality of driving projections which engage with a drive wheel to be rotatably driven thereby. Further, these driving projections are guided from the right and left by a group of free wheels each comprising a pair of right and left free wheels. Each of the driving projections has a lateral face which is formed as a continuous inclined face extending with a uniform inclination along the entire height thereof. Whereas, an entire inner engaging face of each of the rotating wheels opposed to the driving projection is formed as an inclined face parallel with the lateral face of the driving projection.

With such crawler traveling apparatus described above, as described above the lateral face of the driving projection is provided as the inclined face having a uniform inclination over the entire height thereof and the inner lateral face of the ground free wheel is provided as the inclined face extending parallel to the lateral face of the driving projection. For this reason, when the crawler belt is laterally displaced due to a thrust applied thereto, the inner lateral face of the ground free wheel comes into contact with the entire lateral face of the driving projection, so that in a high-speed traveling, with relative rotational displacement between the lateral face of the driving projection and the inner lateral face of the ground free wheel there is generated a significant amount of friction heat, which tending to invite deterioration in the strength of the driving projection formed of rubber.

Further, in such operations as turn of the vehicle, slope traveling or a plowing operation when the vehicle travels with the one side of the crawler thereof being inclined and sunk in a plowed ground, there often happens an upper displacement of the ground free wheels relative to the crawler belt. In such case, a significant thrust load will be applied to an upper portion of the tapered driving projection, thus tending to invite deformation of the driving projection, thus resulting in durability deterioration.

Moreover, with such driving projection having right and left lateral faces having continuously uniform inclination, the ground free wheel tends to ride over the upper corner of the driving projection and to become "jammed" therewith. For instance, in the event of such riding of the ground free wheel, if the vehicle effects a traveling along a contour line (slope traveling) or rapid turn, there often occurs displacement in the layout of the driving projections as being deformed laterally of the belt. Then, as the driving projection becomes engaged with the ground free wheel under this condition, the ground free wheel tends to ride over the upper corner of the displaced driving projection, thus tending to invite the "jamming". Also, when the crawler traveling apparatus comes in and out of a plowed groove, the ground free wheel will float off the crawler belt and then when the belt engages with a next driving projection, the jamming tends to occur due to the displacement of the driving projection. Moreover, when one lateral end of the crawler belt rides over a relatively small object such as a stone, a portion of the belt will be pushed up and deformed thereby to cause displacement of its driving projection. Then, when this displaced driving projection comes into engagement with the ground free wheel, the jamming phenomenon will again tend to occur.

SUMMARY OF THE INVENTION

The present invention addresses to the above-described problem of the prior art. A primary object of the invention is to provide a crawler traveling apparatus which allows high-speed traveling with restricting generation of friction heat between the driving projection and the ground free wheel and which also restricts the "jamming" phenomenon between the ground free wheel and the driving projection.

For accomplishing the above-noted object, according to the present invention, a crawler traveling apparatus comprises: a rubber crawler belt having a plurality of driving projections formed with a predetermined peripheral pitch on an inner peripheral face of the belt; a drive wheel rotatable when engaged with the driving projections of the crawler belt for driving the belt; and a plurality of free wheels rotatable for laterally guiding the driving projections under movement;

wherein said each driving projection has an upper half having an upper half lateral face portion and a lower half having a lower half lateral face portion, the upper half lateral face portion having an erect inclination angle smaller than an erect inclination angle of the lower half lateral face portion;

said each free wheel has an inner lateral face opposed to the driving projection, said inner lateral face having an inclined guide face having an inclination parallel to said lower half lateral face portion of the driving projection; and said inclined guide face has a height L3 shorter than a height L1 of said lower half lateral face portion when an inner peripheral face of the crawler belt is placed under proper contact with an outer peripheral face of the free wheel.

With the above-described construction, during traveling on a flat terrain, the crawler belt is subjected to a thrust force to be laterally displaced thereby, so that the lateral face of the free wheel approaches and comes into contact with the lateral face of the driving projection. In this, however, the contact between actually occurs between the lower half lateral face portion of the driving projection and the inclined guide face of the free wheel and the area of this contact is sufficiently smaller than the entire area of the lateral face of the driving projection. Further, as the thrust force generated during traveling on a flat terrain is not so large, the friction heat generated between the lower half lateral face portion of the driving projection and the inclined guide face of the free wheel is relatively small.

Also, in the case of a turn, slope traveling of the vehicle or a plowing operation when the vehicle travels under a laterally inclined posture with its one side crawler being sunk in the plowed track, there sometimes occur upward displacement of the free wheel relative to the crawler belt. However, since the height L3 of the inclined guide face of the free wheel is shorter than the height L1 of the lower half lateral face portion of the driving projection, when the inclined guide face slides relative to the lower half lateral face portion, there occurs no change in the contact area between the lower half lateral face portion of the driving projection and the inclined guide face of the ground free wheel. Then, the thrust load from the free wheel can be supported reliably by the lower half of the driving projection having a larger lateral thickness and correspondingly large rigidity.

Further, in the case of the contour line traveling (slope traveling) or rapid turn, there sometimes occurs lateral deformation in the crawler belt, thus displacing or deforming the layout of the driving projections thereof. Then, as the driving projection becomes engaged with the ground free wheel under this condition, the ground free wheel tends to ride over the upper corner of the displaced driving projection, thus tending to invite the "jamming". Also, when the crawler traveling apparatus comes in and out of a plowed groove, the ground free wheel will float off the crawler belt and then when the belt engages with a next driving projection, the jamming tends to occur due to the displacement of the driving projection. Moreover, when one lateral end of the crawler belt rides over a relatively small object such as a stone, a portion of the belt will be pushed up and deformed thereby to cause displacement of its driving projection. Then, when this displaced driving projection comes into engagement with the ground free wheel, the jamming phenomenon will again tend to occur. However, since the upper half portion of the driving projection has a lateral face having a gentle inclination, the driving projection can easily engage into the free wheel. Consequently, the ground free wheel can smoothly engage even with a slightly displaced driving projection without jamming.

Moreover, the sharp contour of the driving projection provided by the gentle inclination is limited substantially to the upper half of the driving projection, while the lower half of the driving projection has the lower half lateral face portion with a steeper inclination for providing greater thickness in the right and left direction, thus enhanced strength of the driving projection against lateral load.

Accordingly, the crawler traveling apparatus according to the present invention provides the following advantages.

(1) Even in a high speed traveling, frictional heat is restricted thus restricting deterioration of the strength of the driving projection. So that, the high durability can be maintained for a long period of time.

(2) As the upper half of the driving projection is tapered relative to the lower half of the same, the free wheel can smoothly engage even with a displaced driving projection without jamming. This further improves the durability of the crawler belt.

(3) Moreover, since the lower half of the driving projection having increased thickness is supported to the ground free wheel, the driving projection can be strong enough to endure a large thrust load. This still further improves the durability of the crawler belt.

According to one preferred embodiment of the invention, the free wheels include a pilot wheel, a ground free wheel and a guide wheel; and an inner width $W(3)$ of the drive wheel, an inner width $W(6)$ of the ground free wheel and an inner width $W(7)$ of the guide wheel have a relationship of $$W(3) > W(6) > W(7).$$

That is, in order to minimize the contact between the driving projection of the crawler belt and an inner wall face of the drive wheel, the inner width $W(3)$ of the drive wheel is maximized. And, in order to correct lateral displacement of the crawler belt by means of the guide wheel providing only small lateral contact force before the crawler belt comes into engagement with the pilot wheel, the inner width $W(7)$ of the guide wheel is minimized. Furthermore, for the ground free wheel which can provide a large lateral contact force as being subjected to the ground contact force, it is desired to secure a certain amount of play between its inner wall face and the crawler belt. For this reason, it is preferred that the inner width $W(6)$ of the ground free wheel have a value between a value of the inner width $W(3)$ of the drive wheel and a value of the inner width $W(7)$ of the guide wheel.

Preferably, said pilot wheel includes a pair of front and rear pilot wheels, and inner widths $W(4)$ and $W(5)$ of these front and rear pilot wheels which constitute the rest of the free wheels, are substantially equal to or slightly greater than the inner width $W(7)$ of the guide wheel.

Further and other features and advantages of the invention will become apparent upon reading the following detailed disclosure of preferred embodiments thereof with reference to the accompanying drawings.

DESCRIPTION OF THE PREFERRED EMBODIMENTS

Figure 1:
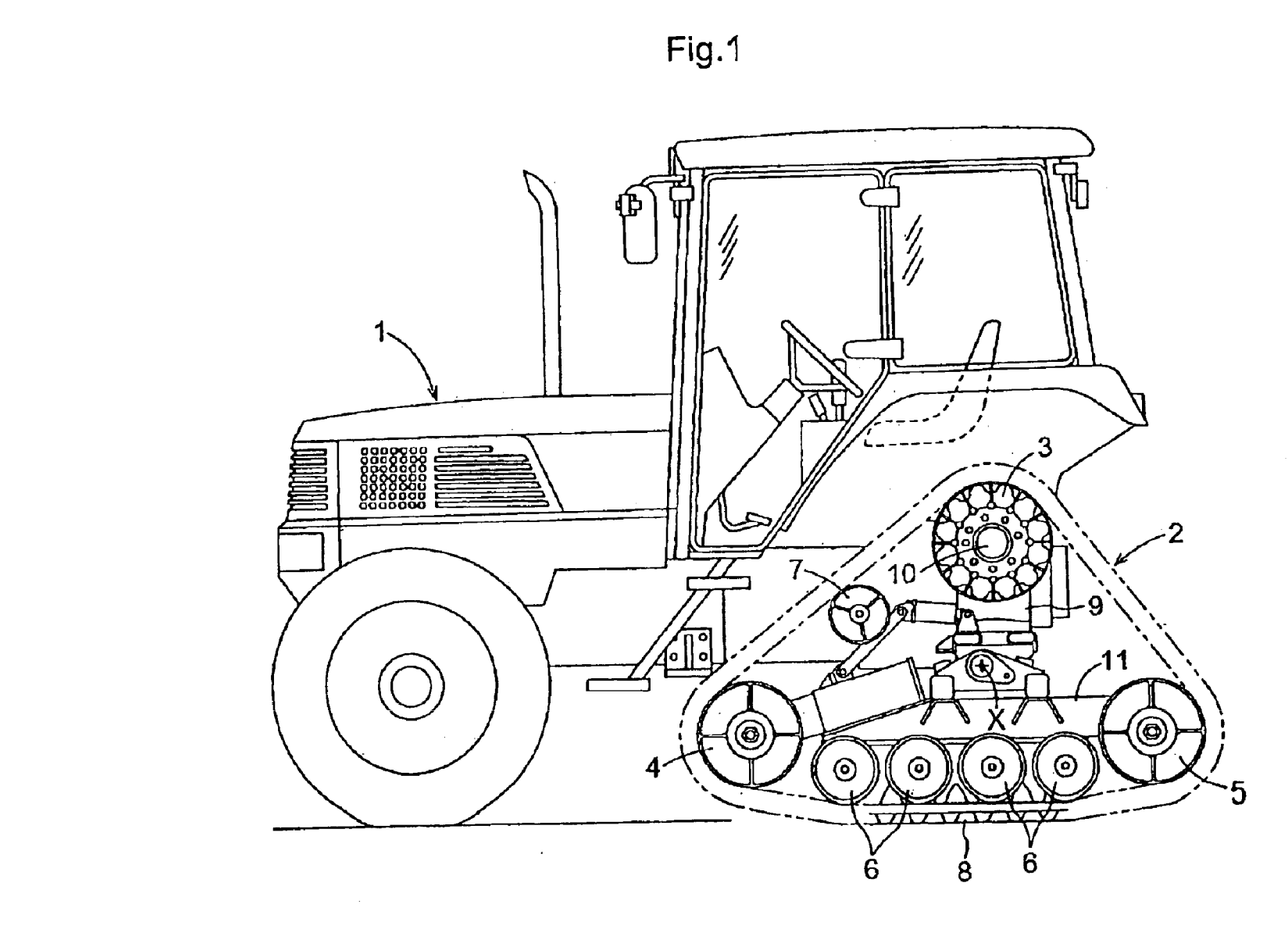
FIG. 1 is an overall side view showing an agricultural tractor using a crawler traveling apparatus relating to the present invention.

FIG. 1 shows, as an example, a tractor having a crawler traveling apparatus according to the present invention.

This tractor is for use mainly in a forage harvesting operation or the like. A body 1 of this tractor is of 4WD type, but includes a pair of right and left crawler traveling apparatuses 2, instead of right and left rear wheels. Though not shown, various implements such as a forage harvester, grass mower can be coupled to the tractor body 1.

Figure 2:
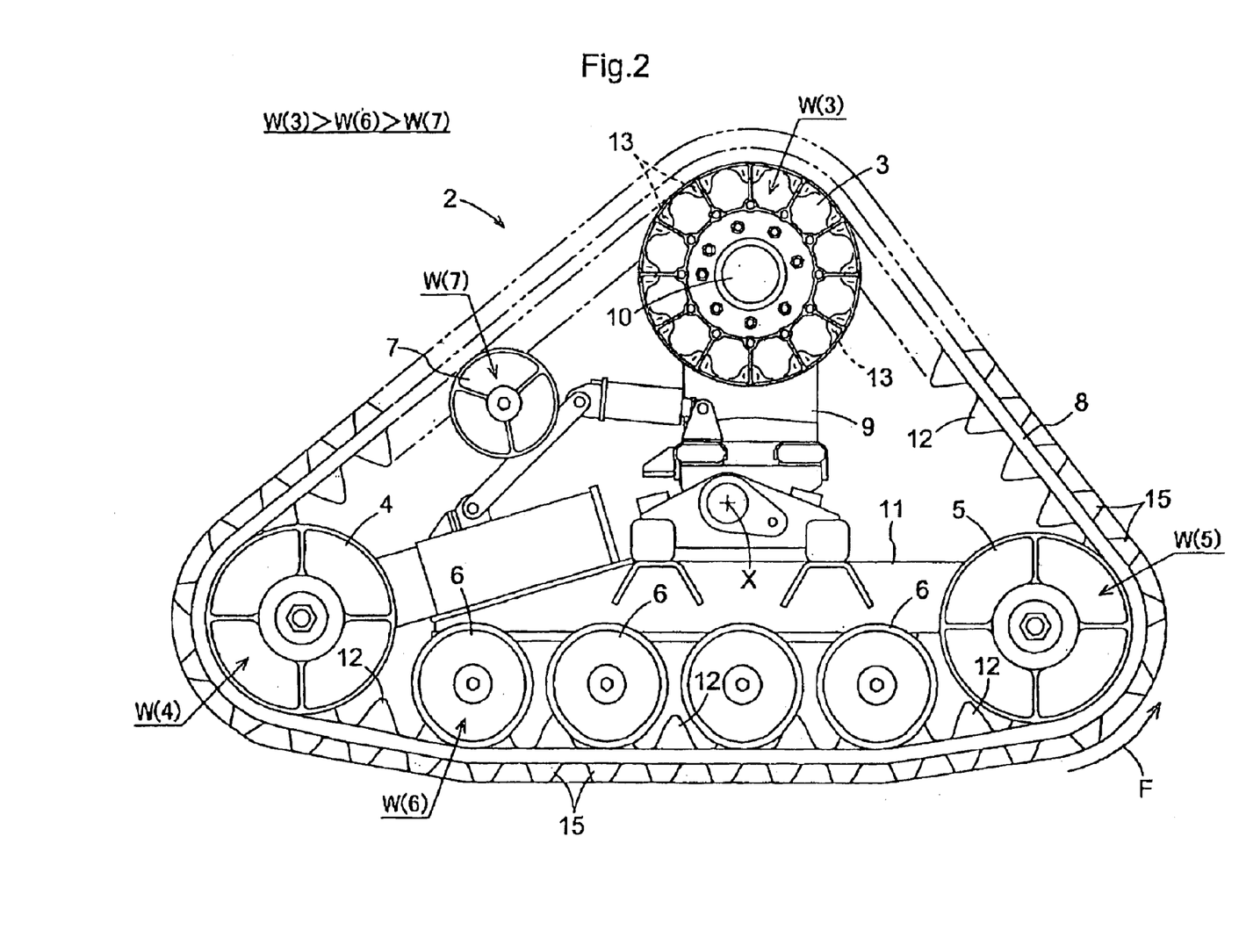
FIG. 2 is a side view of the crawler traveling apparatus.

The crawler traveling apparatus 2 includes a drive wheel 3, front and rear pilot wheels 4, 5 for applying a tension to a rubber crawler belt 8 by means of a tension mechanism, a group of ground free wheels 6 and a guide wheel 7, with the rubber crawler belt 8 being entrained in an approximate triangular form about all these wheels. The drive wheel 3 is coupled with a drive shaft 10 provided in a rear axle casing 9 mounted on the tractor body 1. Also, the front pilot wheel 4, the rear pilot wheel 6, the ground free wheels 6 and the guide wheel 7 are mounted to a tractor frame 11 pivotally connected to the rear axle casing 9 to be pivotable about a horizontal pivot X.

Figure 4:
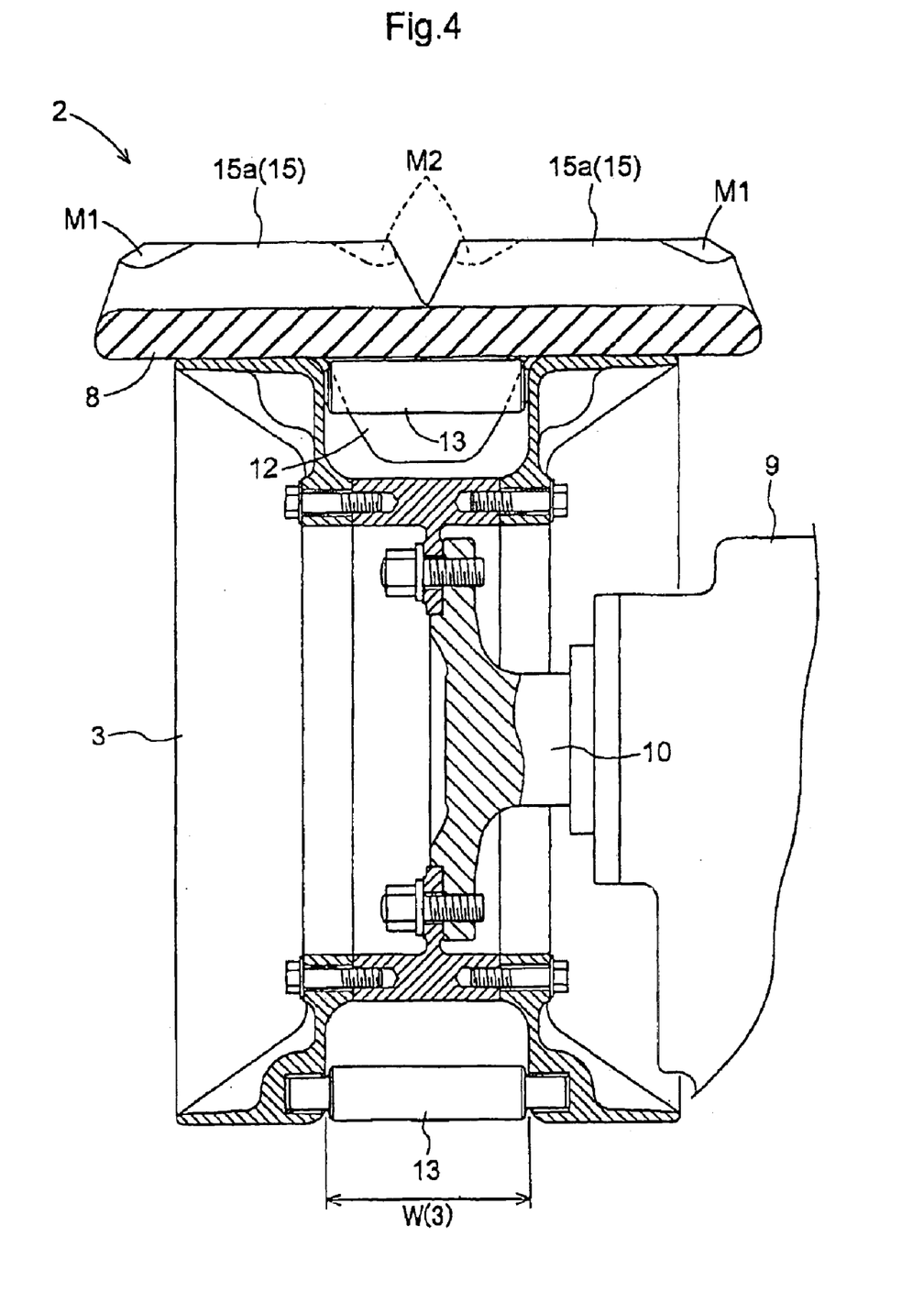
FIG. 4 is a front view in vertical section illustrating relationship between a drive wheel and a crawler belt of the crawler traveling apparatus.

The crawler belt 8 includes, in its inner peripheral face, a plurality of driving projects 12 arranged by a predetermined peripheral pitch and along the width-wise intermediate portion of the face. Whereas, the drive wheel 3 horizontally mounts a plurality of drive pins 13 along an outer periphery thereof, with the pins 13 being disposed by a predetermined peripheral pitch. Then, in operation, as the drive pin 13 comes into engagement with the driving projection 12 thereby to drive and rotate the drive wheel 3 forwardly or reversely, the crawler belt 8 is driven to rotate forwardly or reversely.

Figure 8:
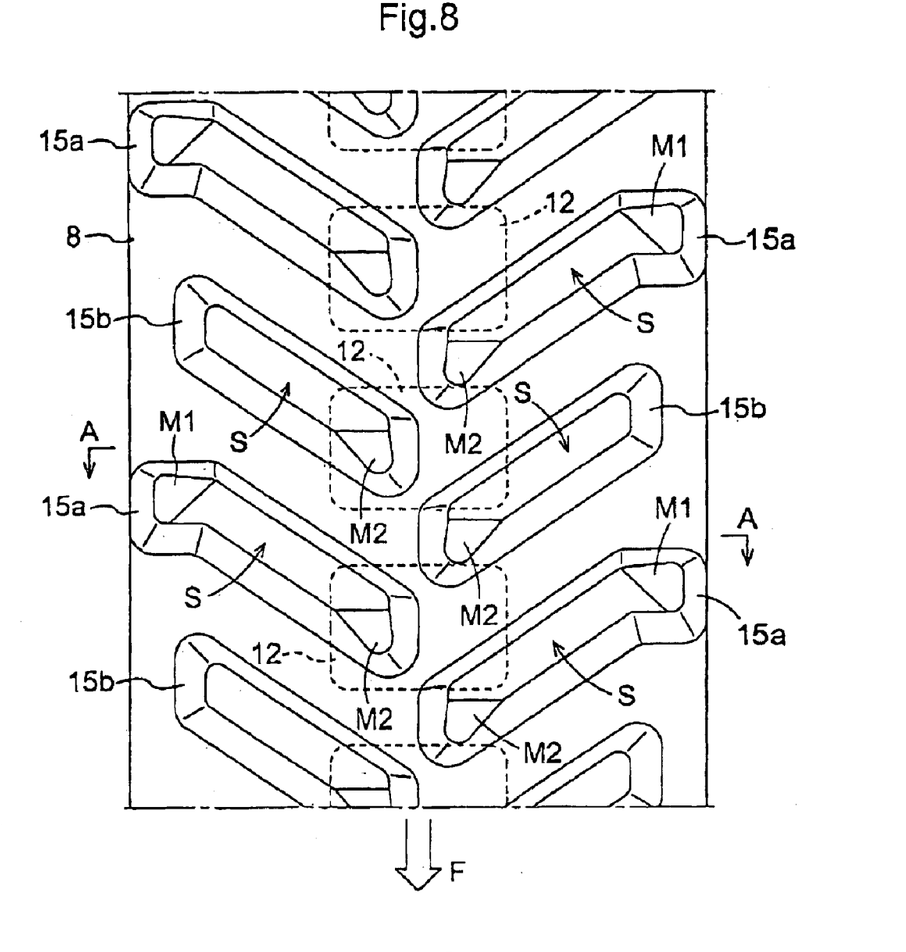
FIG. 8 is a plan view of a lug pattern of the crawler belt.
Figure 9:
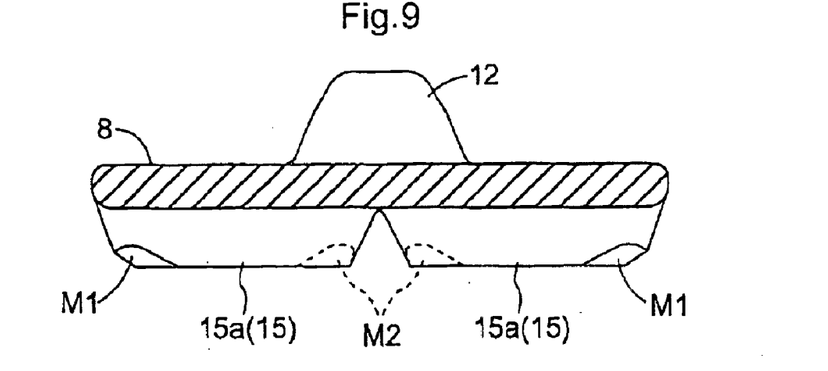
FIG. 9 is a section taken along A—A line in FIG. 8.
Figure 10:
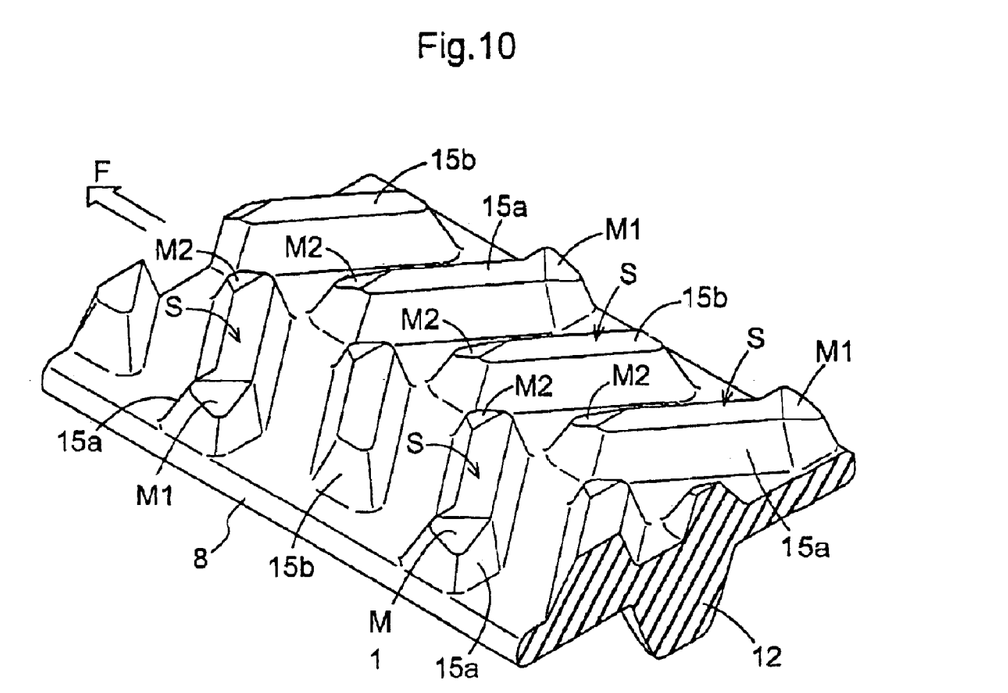
FIG. 10 is a perspective view showing a portion of the crawler belt.

Further, on the outer peripheral face of the crawler belt 8, there are formed a plurality of propelling lugs 15 laid out in a pattern shown in FIG. 8. These propelling lugs 15 includes long lugs 15a each extending from the center of the belt width to the outer end of the same and short lugs 15b extending from the center of the belt width but short of the outer end thereof, with the long lugs and short lugs being arranged alternately along the peripheral direction of the belt in a zigzag pattern. Also, a near outer end portion of the long lug 15a, i.e. the long lug portion extending outward beyond the outer limit the short lug 15b is bent so as to extend substantially normal to the peripheral direction of the belt.

The above-described alternating layout of the long lugs 15a and the short lugs 15b along the belt peripheral direction provides an advantage of increasing a soil-retaining length between the long lugs 15a adjacent one after another in the vicinity of the outer end of the belt, thereby to effectively restrict occurrence of cutting (shearing) of the soil at this portion. As a result, the propelling force is increased and occurrence of slip is effectively restricted. More particularly, the arrangement of the long lug portion extending outward beyond the outer limit the short lug 15b being bent so as to extend substantially normal to the peripheral direction of the belt, can restrict breaking and dropping of the soil once retained between the long lugs 15a adjacent one after another in the vicinity of the outer end of the belt, thereby to further enhance the soil retaining function in the vicinity of the outer end of the long lug 15a. Further, the arrangement of the long lugs 15a and the short lugs 15b extending in the form of a center-open hook narrowed form the opposed sides relative to the forward rotating direction F of the belt in the zigzag pattern allows the groups of lugs to contact the ground surface one after another continuously, thus allowing the vehicle to travel with reduced vibration. Further, during a forward traveling, soil may be stuck between the lugs when the crawler belt 8 is rotated up along the rear pilot wheel 5 at the rear end of the traveling apparatus. In such case, the arrangement of the lug groups extending in the form of a center-open hook narrowed form the opposed sides relative to the forward rotating direction of the belt, serves to allow smooth detachment of the soil from between the lugs.

In the above, at an inner end of each of the long lugs 15a and short lugs 15b, there is formed an inclined chamfered portion M2 extending toward the forward rotating direction F of the belt. When, the vehicle travels on a pasture land and the inner ends of the long lugs 15a and the short lugs 15b come into contact with the ground surface, the contact with the ground surface can proceed smoothly without digging the soil by the corners of the inner ends of the lugs 15.

Further, at an outer end portion of a top ground contacting face S of the long lug 15a, there is formed another inclined chamfered portion M1 extending in the widening direction of the center-open hook. Then, during forward traveling on a pasture land, when the belt 8 is wound up by the rear pilot wheel 5, the inclined chamfered portion M1 effectively restricts digging up of a root of the grass with the corner of the outer end of the long lug 15 sunk into the soil.

Figure 3:
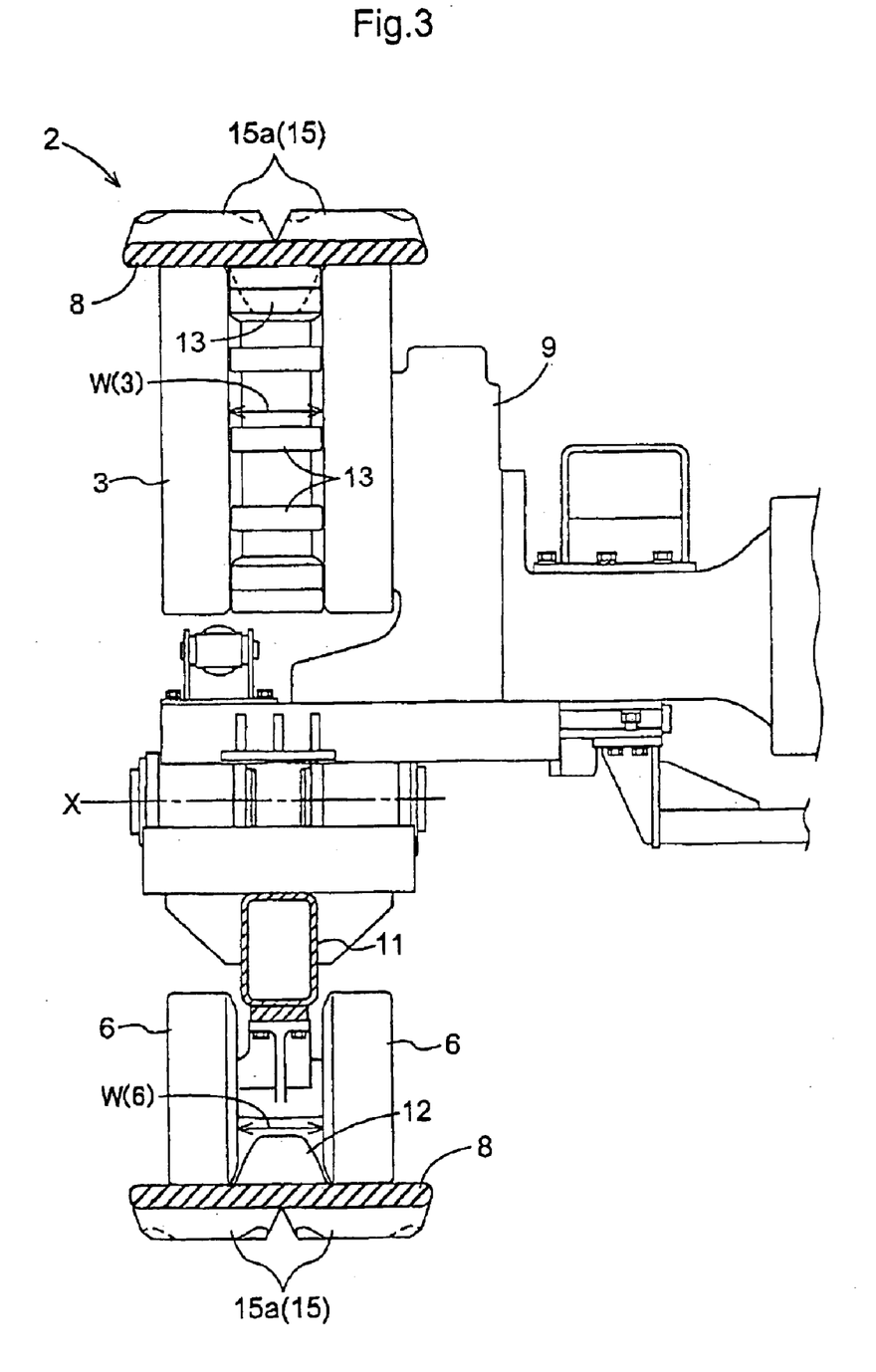
FIG. 3 is a front view in vertical section showing the crawler traveling apparatus.

Each of the front pilot wheel 4, the rear pilot wheel 5, the ground free wheels 6 and the guide wheel 7 comprises a free wheels of the so-called outer wheel type including a pair of right and left free wheels spaced apart by a predetermined distance therebetween. And, as these free wheels come into engagement with the driving projections 12 from the right and left sides thereof, right and left displacement of the crawler belts 8 is restricted.

Figure 5:
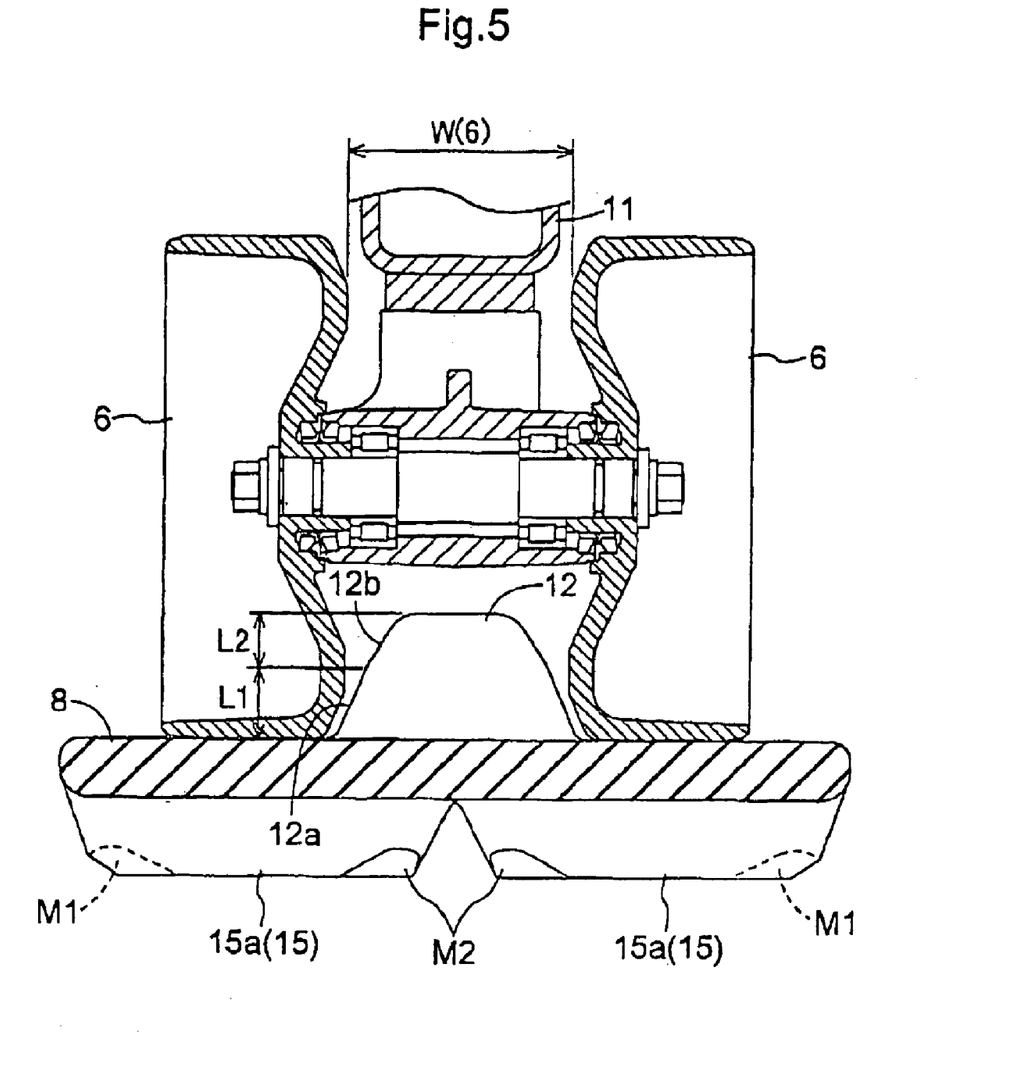
FIG. 5 is a front view in vertical section illustrating relationship between a ground free wheel and the crawler belt of the crawler traveling apparatus.

As shown in FIGS. 5 and 6, the lateral face of the driving projection 12 of the crawler belt 8 is divided into a lower half portion 12A and an upper half portion 12B. The lower half portion 12A includes a lower half lateral face portion 12a having an erect inclination angle $\alpha$ and the upper half portion 12B includes an upper half lateral face portion 12b having an erect inclination angle $\beta$. And, the inclination angle $\alpha$ is set to be smaller than the inclination angle $\beta$. The ground free wheel 6 defines along its outer peripheral face a recess groove for binding and guiding the crawler belt. The lateral wall of this recess groove is referred to herein as "inner wall of the free wheel". Adjacent an outer periphery of the inner wall faces of the ground free wheel opposed to the right and left lateral faces of the driving projection 12, there is formed an inclined guide face (c) extending parallel with the lower half lateral face portion 12a of the lower half 12A of the driving projection 12. And, under a condition when the inner peripheral ace of the crawler belt 8 is placed under proper contact with the outer periphery of the ground free wheel 6, the inclined guide face (c) is opposed to the lower half lateral face portion 12a over a range where the height L3 of the guide face (c) is shorter than the height L1 of the lower half 12A. Further, a chamfered portion formed between the inner peripheral face of the driving projection 12 and the lower half lateral face portion 12a has a curvature radius r1 and a chamfered portion formed between the inclined guide face (c) of the ground free wheel 6 and the outer peripheral face has a curvature radius r2, with r1 and r2 being equal or substantially equal to each other. Incidentally, though not shown, the other free wheels (the front pilot wheel 4, the rear pilot wheel 5 and the guide wheel 7) than the ground free wheels 6 also have a similar inclined guide face (c). The height of the upper half 12B of the driving projection 12 is denoted with a mark L2. In this embodiment, L1>L2.

Though denoted only with marks in FIG. 2, the inner widths W(4) and W(5) of the front pilot wheel 4 and the rear pilot wheel 5 are substantially equal to or slightly greater than the inner width W(7) of the guide wheel 7. In order to minimize contact between the driving projection 12 of the crawler belt 8 and the drive wheel 3, the inner width W(3) of the drive wheel 3 is maximized. And, in order to correct lateral displacement of the crawler belt 8 by means of the guide wheel 7 providing only small lateral contact force before the crawler belt 8 comes into engagement with the front pilot wheel 4, the inner width W(7) of the guide wheel 7 is minimized. Furthermore, for the ground free wheel 6 which can provide a large lateral contact force as being subjected to the ground contact force, it is desired to secure a certain amount of play between its inner wall face and the crawler belt 8. For this reason, it is preferred that the inner width W(6) of the ground free wheel 6 have a value between a value of the inner width W(3) of the drive wheel 3 and a value of the inner width W(7) of the guide wheel 7. Accordingly, in this embodiment, the inner width W(3) of the drive wheel which is the minimum inter-inner-wall distance thereof, the inner width W(6) of the ground free wheel 6 which is the minimum inter-inner-wall distance thereof, and the inner width W(7) of the guide wheel 7 which is the minimum inter-inner-wall distance thereof, have a following relationship:

$$W(3)>W(6)>W(7).$$

Figure 7:
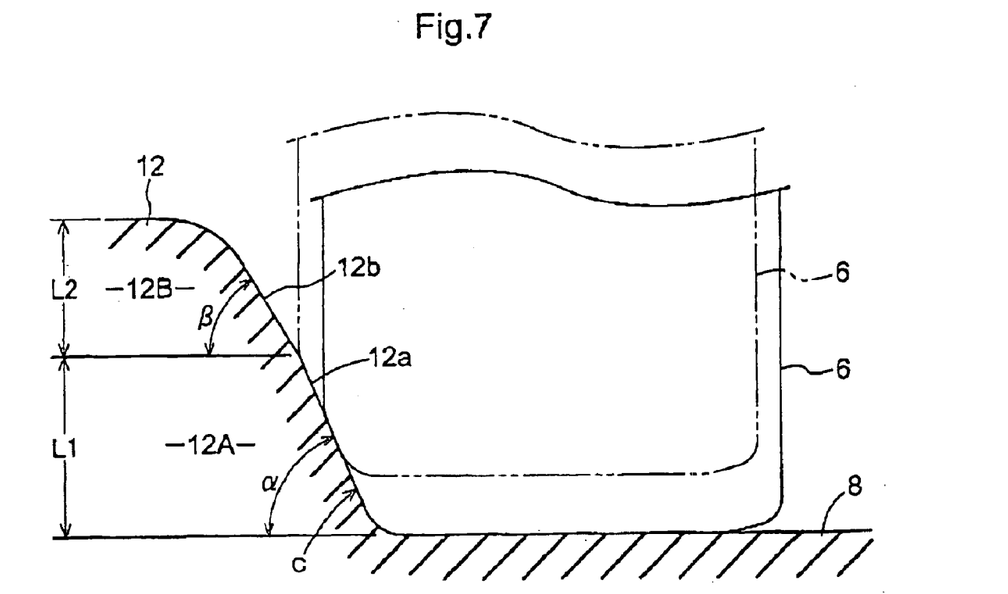
FIG. 7 is an enlarged front view showing the ground free wheel and the driving projection in the event of lateral displacement of the crawler belt.

With the above-described construction of the driving projection 12 and the ground free wheel 6, during traveling on a flat terrain, the crawler belt 8 is subjected to a thrust force to be laterally displaced thereby, so that as shown by a solid line in FIG. 7, the chamfered portion of the ground free wheel 6 will be placed in firm contact with the chamfered portion of the driving projection 12 and also the inclined guide face (c) of the ground free wheel 6 will be brought into contact with the lower half lateral face portion 12a of the lower half 12A of the driving projection 12. In this, however, the area of this contact is sufficiently smaller than the entire area of the lateral face of the driving projection 12. Further, as the thrust force generated during traveling on a flat terrain is not so large, the friction heat generated between the lower half lateral face portion 12a of the lower half 12A of the driving projection 12 and the inclined guide face (c) of the ground free wheel 6 is relatively small. Therefore, even in a high-speed traveling, there will occur no deterioration in the strength of the driving projection 12 due to the friction heat.

Also, in the case of a turn, slope traveling of the vehicle or a plowing operation when the vehicle travels under a laterally inclined posture with its one side crawler being sunk in the plowed track, there sometimes occur upward displacement of the ground free wheel 6 relative to the crawler belt 8. However, since the height L3 of the inclined guide face (c) of the free wheel 6 is shorter than the height L1 of the lower half lateral face portion 12a of the driving projection 12, even when there occurs a relative vertical movement to a height denoted with a virtual line in FIG. 7, there occurs no change in the contact area between the lower half lateral face portion 12a of the driving projection 12 and the inclined guide face (c) of the ground free wheel 6. Then, the thrust load from the free wheel can be supported reliably by the lower half 12A of the driving projection having a larger lateral thickness and correspondingly large rigidity.

Further, in the case of the contour line traveling (slope traveling) or rapid turn, there sometimes occurs lateral deformation in the crawler belt 8, thus displacing or deforming the layout of the driving projections 12 thereof. Then, as the driving projection 12 becomes engaged with the ground free wheel 6 under this condition, the ground free wheel 6 tends to ride over the upper corner of the displaced driving projection 12, thus tending to invite the "jamming". Also, when the crawler traveling apparatus 2 comes in and out of a plowed groove, the ground free wheel 6 will float off the crawler belt 8 and then when the belt engages with a next driving projection 12, the jamming or galling tends to occur due to the displacement of the driving projection 12. Moreover, when one lateral end of the crawler belt rides 8 over a relatively small object such as a stone, a portion of the belt 8 will be pushed up and deformed thereby to cause displacement of its driving projection 12. Then, when this displaced driving projection 12 comes into engagement with the ground free wheel 6, the jamming or galling phenomenon will again tend to occur. However, since the upper half portion 12B of the driving projection 12 has such sharpened contour, the driving projection 12 can easily engage between the right and left wheels of the ground free wheel 6. Consequently, the ground free wheel 6 can smoothly engage even with a slightly displaced driving projection 12 without jamming, thereby to guide the crawler belt 8 smoothly.

Moreover, the sharp contour of the driving projection 12 provided by the smaller inclination angle B provided to the upper half lateral face portion 12b of the driving projection 12, while the lower half 12A of the driving projection has the lower half lateral face portion 12a having the greater inclination angle $\alpha$ for providing greater thickness in the right and left direction, thus enhanced strength of the driving projection 12 against lateral load.

[Other Embodiment]

In the foregoing embodiment, the driving projections 12 of the crawler belt 8 are formed integrally with the belt body and of the rubber material. Instead, the composition of this driving projection 12 may be modified for further increasing the strength and frictional wear resistance.

The invention may be embodied in any other way than disclosed in the above detailed description without departing from the essential spirit thereof defined in the appended claims. All modifications apparent for those skilled in the art are intended to be encompassed within the scope of the invention defined by the claims.

What is claimed is:

1. A crawler traveling apparatus comprising:

a rubber crawler belt having a plurality of driving projections formed with a predetermined peripheral pitch on an inner peripheral face of the belt;

a drive wheel rotatable when engaged with the driving projections of the crawler belt for driving the belt; and a plurality of free wheels rotatable for laterally guiding the driving projections under movement;

wherein said each driving projection has an upper half having an upper half lateral face portion and a lower half having a lower half lateral face portion, the upper half lateral face portion having an erect inclination angle smaller than an erect inclination angle of the lower half lateral face portion;

said each free wheel has an inner lateral face opposed to the driving projection, said inner lateral face having an inclined guide face having an inclination parallel to said lower half lateral face portion of the driving projection; and said inclined guide face has a height L3 shorter than a height L1 of said lower half lateral face portion when an inner peripheral face of the crawler belt is placed under proper contact with an outer peripheral face of the free wheel.

2. The crawler traveling apparatus as defined in claim 1, wherein the free wheels include a pilot wheel, a ground free wheel and a guide wheel; and an inner width W(3) of the drive wheel, an inner width W(6) of the ground free wheel and an inner width W(7) of the guide wheel have a relationship of:

$$W(3)>W(6)>W(7).$$

3. The crawler traveling apparatus as defined in claim 2, wherein said pilot wheel includes a pair of front and rear pilot wheels, and inner widths W(4) and W(5) of these front and rear pilot wheels which constitute the rest of the free wheels, are substantially equal to or slightly greater than the inner width W(7) of the guide wheel.

* * * * *